F. C. BLANCHARD, E. B. CROCKER & H. E. EDDY.
PAPER TESTING DEVICE.
APPLICATION FILED JULY 5, 1912.
1,048,488.
Patented Dec. 31, 1912.
3 SHEETS—SHEET 2.
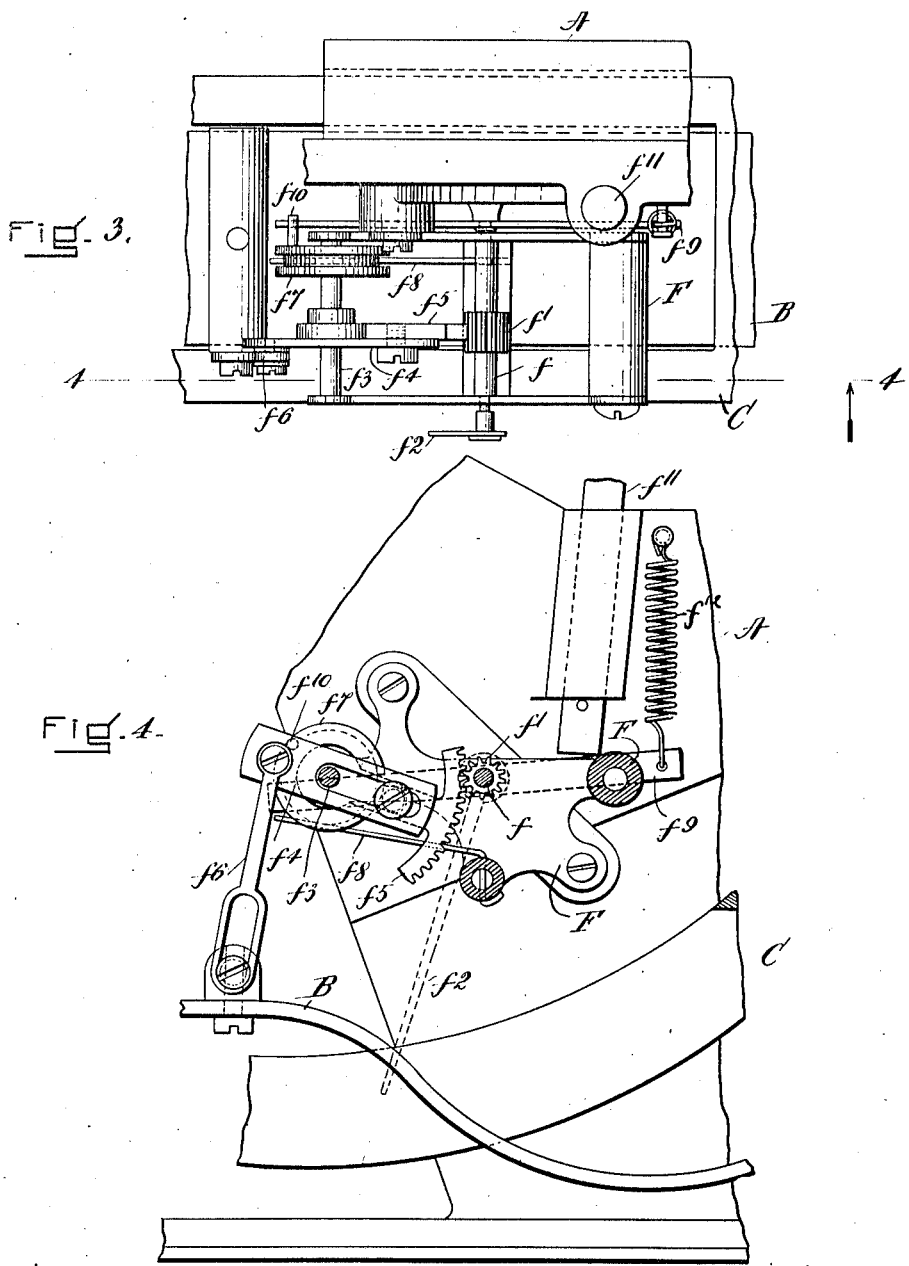

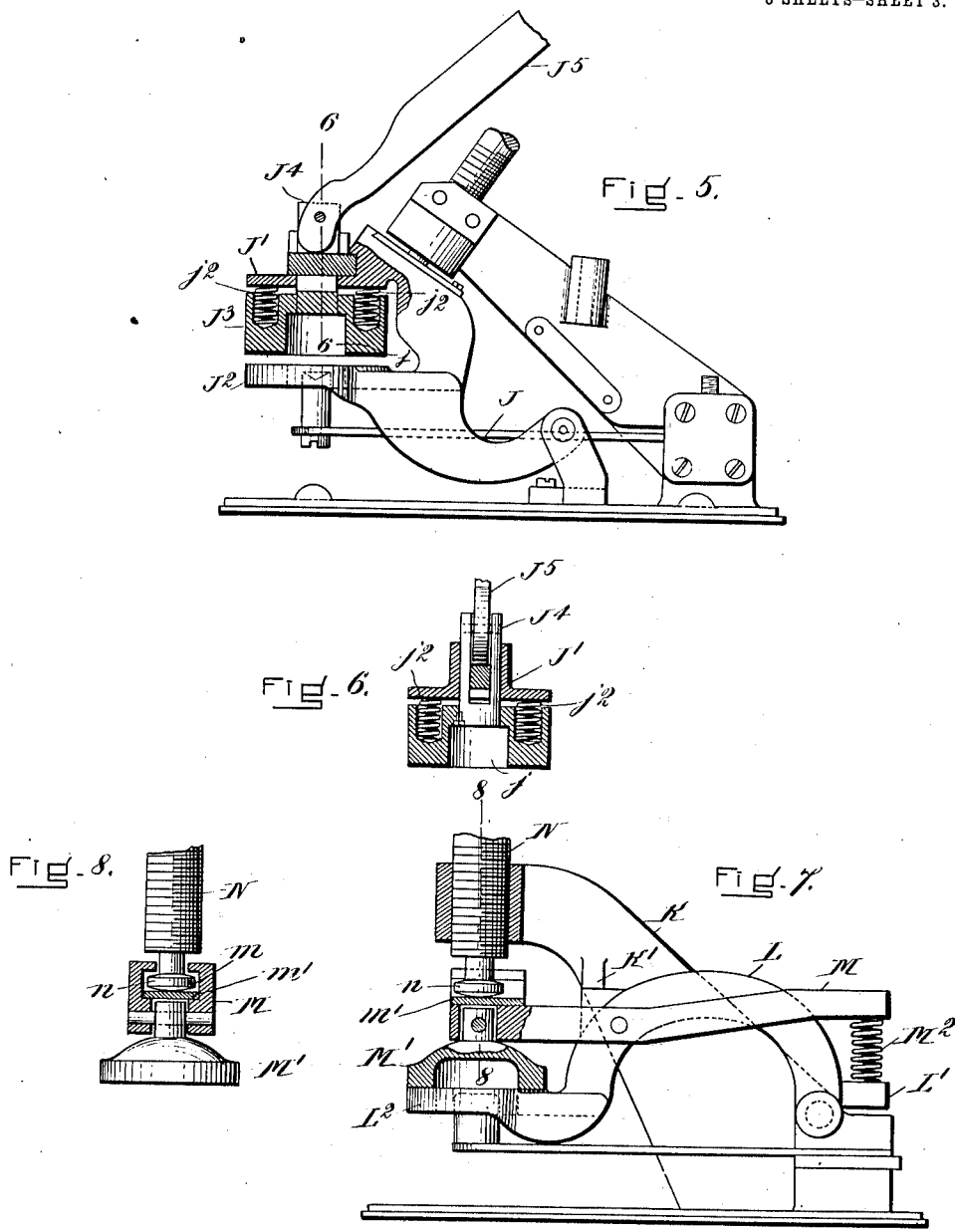

UNITED STATES PATENT OFFICE.

FREDERICK C. BLANCHARD AND ERNEST B. CROCKER, OF BRIDGEPORT, CONNECTICUT, AND HOWARD E. EDDY, OF NEW YORK, N. Y., ASSIGNORS TO THE ASHCROFT MANUFACTURING COMPANY, OF BRIDGEPORT, CONNECTICUT, A CORPORATION OF CONNECTICUT.

PAPER-TESTING DEVICE.

1,048,488.   Specification of Letters Patent.   Patented Dec. 31, 1912.

Application filed July 5, 1912. Serial No. 707,945.

*To all whom it may concern:*

Be it known that we, FREDERICK C. BLANCHARD, of Bridgeport, in the county of Fairfield and State of Connecticut, ERNEST B. CROCKER, of said Bridgeport, and HOWARD E. EDDY, of New York, in the county and State of New York, have invented new and useful Improvements in Paper-Testing Devices, of which the following is a specification.

Our invention relates to devices or instruments for testing the strength of materials, and more particularly for testing the strength of paper of various grades in order to determine its quality.

Our device or instrument is of that general type wherein the paper is clamped in a suitable manner and thereafter subjected to pressure, an indicator being provided for indicating and registering the amount of pressure necessary to fracture or rupture the paper. The devices of this general type which have heretofore been provided, have been for the most part complicated in structure and therefore expensive to manufacture, and consequently offered for sale at a high price. Furthermore, the essential requisite, or at least the most important requirement, of these instruments or devices is accuracy. The device is practically useless if uniform and accurate results are not obtainable thereby. In this essential requisite the devices of this general type heretofore provided have proved unsatisfactory in use, their inaccuracy being due to a number of causes. For example, in many of them the pressure is not uniformly applied with consequent uncertainties and irregularities in the test; in others the paper is ruptured in part by the sudden impact of the plunger; while in others, there are many working parts in train with the indicator movement with the result that there is always a varying element of friction which cannot be taken into account in the calibration of the indicator.

It is the object of our invention to provide a paper tester which shall be of compact, simple construction and thereby adapted to be economically manufactured and sold at a price well within the reach of the average consumer, and which shall accurately perform the test and accurately record the result thereof.

Figure 1:
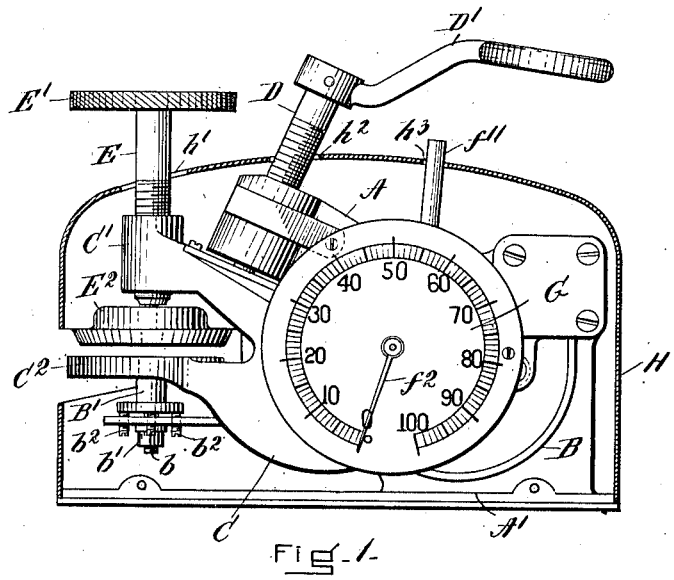
Figure 2:
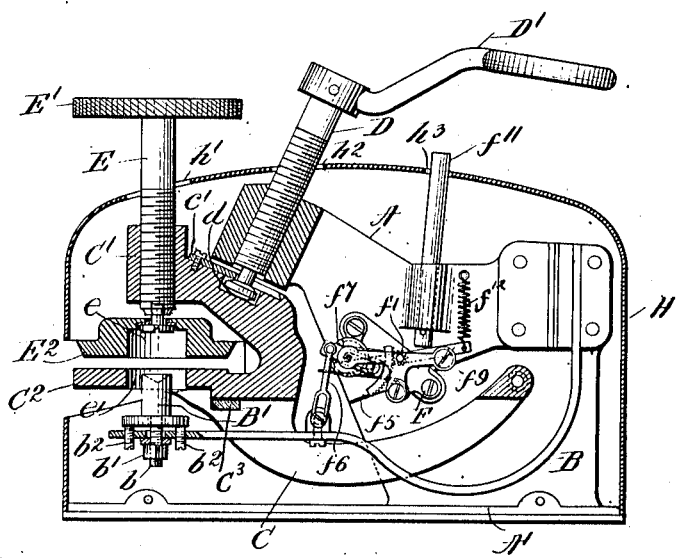

Referring to the drawings, which illustrate certain embodiments of our invention,—Figure 1 is a front view of our improved tester partly in section and partly in elevation; Fig. 2 is a similar view, the indicator dial being removed to show the indicator movement, and parts being shown in section; Fig. 3 is an enlarged plan view of the indicator movement; Fig. 4 is a sectional view on the line 4—4, Fig. 3; Fig. 5 is a side view partly in section and partly in elevation of a modified form of our invention; Fig. 6 is a sectional view on the line 6—6, Fig. 5; Fig. 7 is a side view partly in section and partly in elevation of another modified form of our invention; and Fig. 8 is a view on line 8—8 of Fig. 7.

Referring to Figs. 1, 2, 3 and 4, A is the frame, preferably cast integral with the base A'. To said frame is anchored in any suitable manner a spring B, preferably of the form shown in said figures, and pivoted to said frame is the clamp carrier C having clamp arms C' and C². The frame A is provided with an internally screw-threaded opening in which is mounted the pressure screw D provided at one end with a handle D' and at its other end with a head $d$ fitting within a recess in the clamp arm C' and held therein by a slotted plate $c'$ screwed to the clamp arm C'. The clamp carrier C is thus movably secured to the frame A and is prevented from dropping down of its own weight upon the spring B. Upon the under side of the clamp carrier there is provided a buffer C³ of cork, felt, rubber or similar material, adapted to take the blow of the spring B after the paper is punctured, as presently to be described.

Upon the clamping arm C' is mounted the upper member of the paper clamp consisting of a screw E provided with a head E' at its top and a disk E² at its lower end. The disk E² has a central plunger opening $e$ and is preferably rotatably mounted on the screw E, as clearly shown in Fig. 2. The clamp arm C² forms the lower member of the paper clamp and is provided with a smooth face of the same contour as the face of the disk E² and with a plunger opening $e'$ adapted to register with the plunger opening $e$ of the disk E².

Near the front end of the spring B is mounted in any suitable manner a plunger

B'. Experience has shown that the most nearly uniform and satisfactory results in paper testing are obtained when the plunger centers in the openings $e$, $e'$ and its surface is parallel with the paper to be tested. Experience has also shown that in tempering the spring it is likely to warp or twist and that it is very difficult thereafter to straighten it. Consequently, the plunger B' is preferably adjustably mounted upon the spring to enable its location and level to be rectified, if necessary, after the spring has been tempered. To this end the plunger is provided with a screw $b$ adapted to pass through a slot in the spring B and having a nut $b'$ for securing the plunger in adjusted position. By this means the plunger may be alined centrally with the openings $e$, $e'$. Preferably also the spring B is provided with adjusting screws $b^2$, as shown, for adjusting the level of the plunger so that its upper surface shall be parallel with the paper to be tested.

Upon the frame A, and connected with the spring B by a link $f^6$, is an indicator movement best shown in Figs. 3 and 4. This movement consists of a frame F having an arbor $f$ provided with a pinion $f'$ and a pointer or index hand $f^2$. Said frame is further provided with an arbor $f^3$ having a crank $f^4$ fast thereon provided at one end with a tooth segment $f^5$ meshing with the pinion $f'$ and connected at its other end by the link $f^6$ with the spring B. Upon said arbor $f^3$ there is also mounted a grooved brake drum $f^7$ which coöperates with a resilient rod $f^8$, secured to the frame $f$, and resting in the groove of said drum $f^7$, to prevent the jar caused by the sudden jump of the spring as the plunger passes through the paper from rotating the arbor $f^3$ and actuating the index hand.

The movement is further provided with resetting mechanism for returning the index hand to zero position. This resetting mechanism consists of a lever $f^9$ mounted upon the frame A and adapted to engage a pin $f^{10}$ upon the drum $f^7$. The push pin $f^{11}$, slidably mounted on said frame A, is adapted to engage said lever $f^9$ and cause said lever to engage the pin $f^{10}$ to rotate the drum $f^7$, which rotary motion being communicated to the arbor $f$ through the arbor $f^3$, segment $f^5$ and pinion $f'$, causes the index hand to return to zero position. After the index hand has been reset, the tension spring $f^{12}$ returns the lever $f^9$ to normal position.

A dial G is secured in any suitable manner to the frame A, and a casing H provided with an opening through which the dial G may be read, an opening for inserting the paper between the paper clamp and with openings $h$, $h'$, $h^2$, for the screw E, screw D and push pin $f^{11}$ respectively, covers the device.

The operation of the device is as follows, the parts being in their normal position shown in Figs. 1 and 2: The paper to be tested is inserted between the paper clamp members $E^2$ and $C^2$ and the screw E is run down bringing the disk $E^2$ down onto the clamp arm $C^2$, thus firmly clamping the paper between the clamping members. The handle D' is then turned, forcing the pressure screw D and the clamp carrier C downward. As the clamp carrier travels downward the paper is brought into contact with the plunger B' and continued downward movement forces the plunger and spring B downward until the pressure causes the plunger to rupture or puncture the paper, thus completing the test. It will be understood that the downward movement of the spring B is communicated to the indicator movement through the link $f^6$ and actuates the index hand or pointer causing it to travel over the face of the dial until the downward movement of the spring ceases with the rupturing of the paper, thus indicating and registering the amount of pressure to rupture the paper.

When the test has been completed by the rupturing of the paper, the indicator is read, and the pressure screw D is run up to the limit of its travel, lifting the clamp carrier C back to its normal position shown in Figs. 1 and 2. The disk $E^2$ is then lifted to permit the removal of the paper and the index hand is reset at zero by the means already described. The device is then again ready for use.

Under some conditions of use, and in testing some grades of paper, it is possible and sometimes desirable to employ a paper clamp which may be more quickly operated than the clamp shown in Figs. 1 and 2. In Figs. 5 and 6 there is shown a clamp carrier J having clamp arms J' and $J^2$. The lower clamp arm $J^2$ forms the lower member of the paper clamp as in the form shown in Figs. 1 and 2. The upper paper clamp member $J^3$ is preferably cylindrical and is provided with a plunger opening $j$ and a plurality of recesses in which are springs $j^2$ held under compression between the member $J^3$ and the clamp arm J'. A spindle $J^4$ secured to said clamp member $J^3$ extends upward through the arm J' and is provided with a cam handle $J^5$ adapted to raise and lower said clamping member $J^3$. It will be apparent that when the handle $J^5$ is turned down the springs expand and securely clamp the paper between the clamping members $J^2$ and $J^3$, and that when the handle $J^5$ is lifted, it raises the clamp member $J^3$ and releases the paper.

Instead of the manually operated paper clamps shown in Figs. 1 to 6, it is desirable under some conditions of use, and in testing some grades of paper, to employ an automatic paper clamp, such for example, as is shown in Figs. 7 and 8. Referring to these figures, K is the frame provided with a stop K'. L is the clamp carrier pivoted to the frame and having a lug L' and a clamp arm L² which forms the lower member of the paper clamp. Pivoted to the paper clamp carrier L is an arm M, to one end of which is secured the upper paper clamping member M', the other end being connected to the lug L' by a spring M². N is the pressure screw mounted on the frame K and having at its lower end a head $n$ fitting within a recess $m$ in the arm M and having a bearing upon a plate $m'$ which is preferably made of hard steel adapted to resist wear.

The operation of this automatic clamp is as follows: The paper to be tested is placed between the clamping members M' and L². The screw N is then run down forcing down the clamp carrier L. The paper is thus firmly clamped, and further movement of the screw N forces the carrier L and the paper on the plunger and makes the test. Upon the return stroke, i. e., as the screw N is run up, the arm L² strikes against the stop K' and further upward movement of the screw N lifts the disk M' away from the clamping member L², thus compressing the spring M². When now a fresh piece of paper is inserted for purposes of test and the screw N run down, the spring M² expands until the paper is firmly clamped, and further downward movement of the paper clamp carrier carries the paper down on the plunger and makes the test.

It will be clear that as the pressure screw is mounted on the frame, the pressure is always uniform. It will be equally clear that the parts are so organized and arranged, that the pressure screw causes the paper to come down upon the plunger gradually and slowly thus absolutely eliminating any possibility of the rupture of the paper by sudden, quick impact with the plunger.

It will be seen that the element of the combination which is mounted upon the spring B, that is, the plunger B' in the specific embodiment shown, has no ways or guides to bind or cramp its movement or in which friction may arise, i. e., the plunger is freely mounted on the spring.

It will be further seen that as the paper is brought directly onto the freely mounted plunger the deflection of the spring gives an exact measure of the strength of the paper. Thus the only chance for an inaccuracy due to friction is in the gearage and linking between the spring and the indicator pointer. These connecting means are simple and must of necessity be present in any device of this kind so that in this testing device inaccuracy due to the varying element of friction is rendered negligible, if indeed it is not brought to an irreducible minimum.

By this construction, therefore, a paper tester is provided which is simple and compact and which accurately performs the test, and accurately registers the result thereof.

We claim:—

1. A paper testing device, comprising a spring, a paper clamping member and a plunger member, one of said members freely mounted on said spring, and means to move the other of said members toward and away from said spring.

2. A paper testing device, comprising a spring, a movable paper clamp and a plunger freely mounted on said spring, and means to move said clamp toward and away from said plunger.

3. A paper testing device, comprising a leaf spring, a movable paper clamp and a plunger freely mounted on said spring, and means to move said clamp toward and away from said plunger.

4. A paper testing device, comprising a spring, a movable paper clamp and a plunger freely mounted on said spring, and a screw adapted slowly and gradually to move said clamp toward and away from said plunger.

5. A paper testing device comprising a spring, a movable paper clamp and a plunger freely mounted on said spring, a frame, and means mounted on said frame adapted to move said clamp toward and away from said plunger.

6. A paper testing device, comprising a spring, a plunger freely mounted on said spring, a movable clamp-carrier provided with a paper clamp, a frame and means mounted on said frame adapted to move said carrier and said clamp toward and away from said plunger.

7. A paper testing device, comprising a spring, a plunger freely mounted on said spring, a movable paper clamp located above said plunger and comprising a fixed member and a movable member, each of said members having plunger openings and means to move said clamp toward and away from said plunger.

8. A paper testing device comprising a resiliently mounted plunger, a movable clamp carrier provided with a paper clamp located above said plunger, said clamp comprising a fixed member and a movable member, each of said members having plunger openings, a frame, and means mounted on said frame adapted to move said carrier and said clamp toward and away from said plunger.

9. A paper testing device comprising a resiliently mounted plunger, a movable clamp carrier provided with a paper clamp located above said plunger, said clamp comprising a fixed member having a plunger opening, and a movable member comprising a screw mounted on said carrier and provided with a disk having a plunger opening, a frame, and means mounted on said frame adapted to move said carrier and said clamp toward and away from said plunger.

10. A paper testing device, comprising a spring, a paper clamping member and a plunger member, one of said members freely mounted on said spring, means to move the other of said members toward and away from said spring, an indicator, and connecting means between said indicator and said spring.

11. A paper testing device, comprising a spring, a movable paper clamp and a plunger freely mounted on said spring, means to move said clamp toward and away from said plunger, an indicator, and connecting means between said indicator and said spring.

12. A paper testing device comprising a spring, a plunger mounted on said spring, a movable clamp carrier provided with a paper clamp located above said plunger, a frame, an indicator mounted on said frame, connecting means between said spring and said indicator, and means mounted on said frame adapted to move said carrier and said clamp toward and away from said plunger.

13. A paper testing device comprising a frame, a spring anchored to said frame, a plunger mounted on said spring, a clamp carrier pivoted to said frame and provided with a paper clamp located above said plunger, an indicator mounted on said frame, connecting means between said spring and said indicator, and a screw mounted on said frame and connected with said carrier, adapted to move said carrier and said clamp toward and away from said plunger.

14. A paper testing device comprising a frame, a spring anchored to said frame, a plunger adjustably mounted on said spring, a clamp carrier pivoted to said frame and provided with a paper clamp consisting of a fixed member having a plunger opening, and a movable member comprising a screw mounted on said carrier and having a disk provided with a plunger opening, an indicator mounted on said frame, connecting means between said spring and said indicator, means mounted on said frame for resetting said indicator, and a screw mounted on said frame and connected with said carrier, adapted to move said carrier and said clamp toward and away from said plunger.

Signed by us at Bridgeport, Connecticut this 28th day of June, 1912.

FREDERICK C. BLANCHARD.
ERNEST B. CROCKER.
HOWARD E. EDDY.

Witnesses:
W. R. CLARKE,
S. F. CONE.